(12) United States Patent
Baumeister et al.

(10) Patent No.: US 9,228,754 B2
(45) Date of Patent: Jan. 5, 2016

(54) CUBOIDAL HOUSING FOR ACCOMMODATING COMPONENTS OF AIR-CONDITIONING OR VENTILATION SYSTEM

(75) Inventors: Gregor Baumeister, Krefeld (DE); Georg Hetzel, Olpe (DE); Ralf Joneleit, Moers (DE); Klaus Niklas, Rheinberg (DE)

(73) Assignee: TROX GmbH, Neukirchen-Vluyn (DE)

( * ) Notice: Subject to any disclaimer, the term of this patent is extended or adjusted under 35 U.S.C. 154(b) by 892 days.

(21) Appl. No.: 13/369,925

(22) Filed: Feb. 9, 2012

(65) Prior Publication Data
US 2012/0205078 A1 Aug. 16, 2012

(30) Foreign Application Priority Data

Feb. 10, 2011 (EP) .................................... 11154079
Feb. 11, 2011 (EP) .................................... 11154179

(51) Int. Cl.
| | |
|---|---|
| E04H 5/00 | (2006.01) |
| F24F 13/20 | (2006.01) |
| A47B 47/00 | (2006.01) |
| F16M 1/00 | (2006.01) |
| F24F 3/044 | (2006.01) |
| F25D 23/06 | (2006.01) |

(52) U.S. Cl.
CPC .............. *F24F 13/20* (2013.01); *A47B 47/0041* (2013.01); *F16M 1/00* (2013.01); *F24F 3/0442* (2013.01); *F24F 2221/36* (2013.01); *F25D 23/063* (2013.01)

(58) Field of Classification Search
USPC ......... 52/79.1, 79.5, 79.7, 79.9, 79.12, 309.1, 52/309.2, 474, 483.1, 794.1, 800.1, 802.1
See application file for complete search history.

(56) References Cited

U.S. PATENT DOCUMENTS

| | | | | |
|---|---|---|---|---|
| 3,975,878 | A * | 8/1976 | Modarelli, Jr. ................ | 52/285.2 |
| 3,998,024 | A * | 12/1976 | Frandsen ...................... | 52/592.1 |
| 6,148,575 | A * | 11/2000 | Dingler ........................ | 52/309.16 |
| 6,676,234 | B2 * | 1/2004 | Herbeck et al. ............. | 312/265.4 |
| 6,962,031 | B2 * | 11/2005 | Clarke et al. ................ | 52/802.11 |

FOREIGN PATENT DOCUMENTS

| | | |
|---|---|---|
| DE | 19719783 C1 | 12/1998 |
| EP | 0933599 A1 | 8/1999 |
| EP | 1152194 A1 | 11/2001 |

* cited by examiner

*Primary Examiner* — Patrick Maestri
(74) *Attorney, Agent, or Firm* — Berenato & White, LLC

(57) ABSTRACT

The invention relates to a cuboidal housing for components of a HVAC system. The housing has at least one air inlet, at least one air outlet and a frame. The frame consists of twelve segments which form edge lines. The segments span six open side surfaces in a sealing manner with the open side surface of an adjacent housing, and an insulating means is located between the inner wall and the outer wall. Each panel element has a plastic profile wherein the profile has two bearing limbs each having a bearing surface. In the fitted state, the bearing surface of one bearing limb is in contact with the outer side of the frame segment directly or via at least one further component. In the fitted state, the bearing surface of the other bearing limb faces that side of the frame segment which is facing in the direction of the interior.

22 Claims, 10 Drawing Sheets

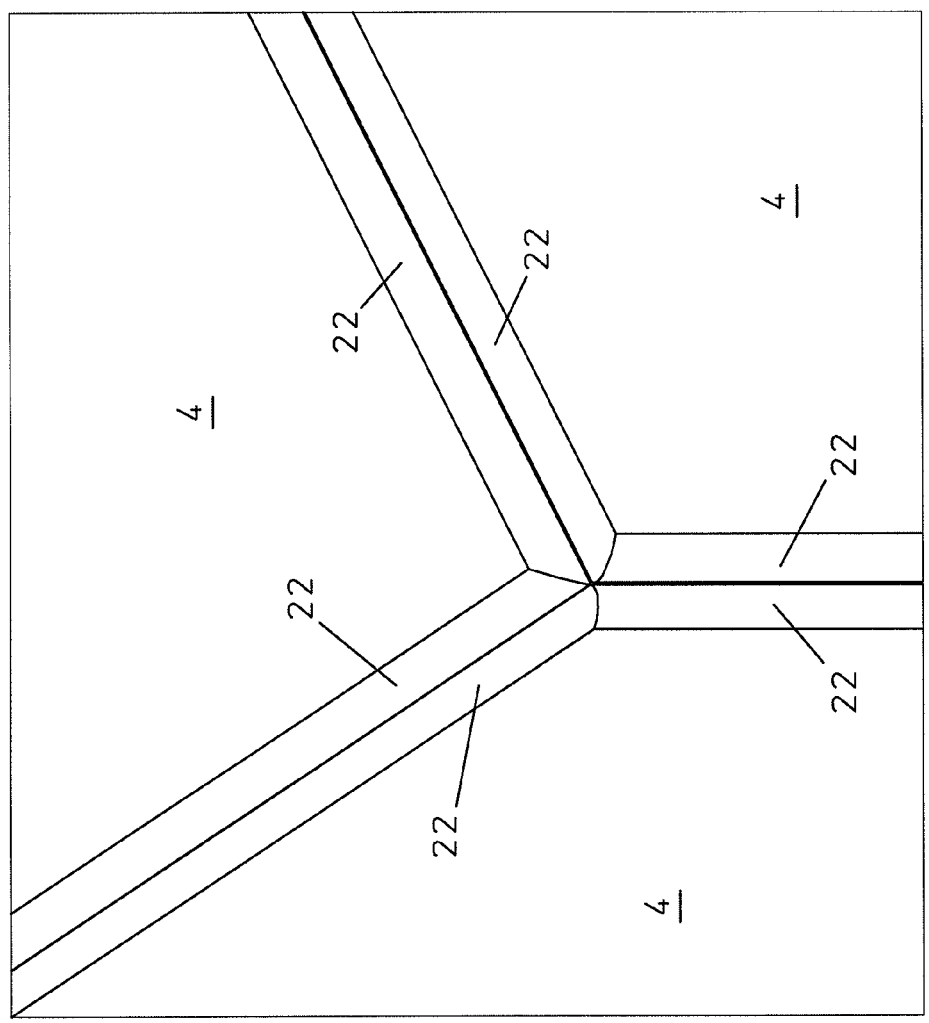

CUBOIDAL HOUSING FOR ACCOMMODATING COMPONENTS OF AIR-CONDITIONING OR VENTILATION SYSTEM

CROSS-REFERENCE TO RELATED APPLICATIONS AND CLAIM TO PRIORITY

This application is related to application number 11154079.5 filed Feb. 10, 2011 with the European Patent Office and application number 11154179.3 filed Feb. 11, 2011 with the European Patent Office, the disclosures of which are incorporated herein by reference and to which priority is claimed.

FIELD OF THE INVENTION

The invention relates to a cuboidal, in particular cubic, housing for accommodating components of an air-conditioning and/or ventilation system, such as, for example, a fan, a filter, a heat exchanger or the like.

BACKGROUND OF THE INVENTION

The housing has at least one air inlet opening, at least one air outlet opening and a frame, wherein the frame consists of at least twelve frame segments which form the edge lines, and the frame segments span at least six open side surfaces, and each open side surface, if the housing with said open side surface does not interact, at least in a partial region of said side surface, in a sealing manner with the open side surface of an adjacent housing, is closed by a panel element which has an inner wall closing the open side surface, an outer wall closing the open side surface, and an insulating means located between the inner wall and the outer wall, in particular a core consisting of insulating material.

The standard housing is cuboidal. Different components of an air-conditioning and/or ventilation system can be placed into the housing. The housing typically has at least one air inlet and at least one air outlet and a frame. The frame consists of at least 12 frame segments. The 12 frame segments form edge lines and provide six open side surfaces. Each open side surface, if the housing does not abut a side surface of an adjacent housing, is closed by a panel. Each panel has an inner wall, which closes the open side surface, and an outer wall. An insulator is disposed between the inner and outer walls. If only one housing is used, six panels are needed to close the six open side surfaces. If two housings are attached, each housing is closed by five panels as the sixth open side surface of each housing abouts and interacts with the sixth open side surface of the adjacent, abutting housing.

The frame has at least twelve frame segments which form the edge lines. In this case, the frame segments span six open side surfaces. Of course, it is possible for frame segments designed as an intermediate web or intermediate element additionally also to be provided. If, for example, a frame segment designed as an intermediate web or intermediate element is provided, said frame element extends through an open side surface and divides the latter into partial surfaces. Of course, a plurality of frame segments, designed as an intermediate web or intermediate element, within a side surface is also conceivable.

The required components of an air-conditioning and/or ventilation system are installed in a housing of this type. Depending on the required space, it is also possible for a plurality of housings to be connected to one another, wherein, then, customarily, only the open side surfaces which are not in contact with an adjacent housing are closed by panel elements. The frame of a housing is designed in the manner of a wire cage, wherein four frame segments in each case span an open side surface. The air inlet opening and/or the air outlet opening can be arranged in the region of a common side surface or else in two different side surfaces. The air inlet opening and/or the air outlet opening can extend only over a partial region or else over an entire side surface. Depending on the desired manner of operation, a negative pressure or else a positive pressure can be set in the housing itself. A disadvantage of known housings is that heat is output via the panel elements and also via the frame to the surroundings, which results in undesirable losses.

It is the object of the invention to avoid the abovementioned disadvantages and to specify a housing which can be fitted easily and is also easily accessible, for example, for maintenance, and has better insulation.

SUMMARY OF THE INVENTION

This object is achieved in that each panel element in the region of each edge has a profile, in particular plastics profile, thermally separating the outer and inner wall, wherein the profile has two bearing limbs each having a bearing surface, wherein, in the fitted state, the bearing surface of the one bearing limb is in contact with the outer side of the frame segment directly or via at least one further component, and, in the fitted state, the bearing surface of the other bearing limb faces that side of the frame segment which is arranged facing in the direction of the interior, which is enclosed by the four frame segments forming the open side surface, wherein the respective bearing limbs of two neighbouring profiles of adjacent panel elements are designed in such a manner that the frame is covered at least on the outside.

An open side surface can be closed here by a single panel element. In this case, said panel element is in contact via the profiles thereof with the sides of four frame segments which face the interior, which is enclosed by the four frame segments forming the open side surface.

However, it is entirely also possible for a panel element to be of multi-part design, in particular two-part design, with a corresponding number of panel subelements being formed. In this case, an open side surface is closed by the corresponding number of panel subelements. In the event of, for example, two panel subelements, each of the two panel subelements is in contact via the profiles with the sides of three frame segments which face the interior, which is enclosed by the four frame segments forming the open side surface. The two panel subelements are in sealing contact with each other via the remaining, respective fourth side. It is possible for a frame segment, which is designed as an intermediate web or intermediate element and serves as a stop for the two panel subelements, to be provided in the contact region of two panel subelements.

Each panel element therefore engages by means of a partial region in the open side surface, wherein the bearing surfaces are in contact with those sides of the frame element which face the interior, which is enclosed by the four frame segments forming the open side surface. As an alternative, the bearing surfaces are arranged at a small distance from those sides of the frame element which face the interior, which is enclosed by the four frame segments forming the open side surface, with a narrow clearance being formed.

That part of each panel element which is located outside the open side surface is designed in such a manner that the open side surface is covered from the outside. In this case, said region of the bearing surface is in direct contact with the outside of the frame. However, it is also entirely possible for a further component also to be provided between the bearing surface and the outside of the frame, in particular in order to obtain better sealing.

The configuration of the profiles results in the frame, i.e. the frame segments, being covered at least from the outside. Since the inner wall and the outer wall are thermally separated from each other by the profile and the frame is also completely sealed to the outside, heat losses are reduced.

If a panel element is at right angles to a neighbouring panel element, it is appropriate if at least in each case one bearing limb of the two neighbouring profiles in the region of its free end of the bearing limb, which covers the outside of the frame segment, is formed at an angle ($\alpha$) of approximately 135° with respect to the bearing surface. The frame segment is therefore completely covered from the outside by the profiles.

It is appropriate if at least in each case one bearing limb of neighbouring profiles in the region of its free ends of the bearing limb, which covers the outside of the frame segment, has a web which is arranged at an angle ($\alpha$) of approximately 135° with respect to the bearing surface, in particular is arranged in the region of the inner edge and, at its free end, has a rearwardly directed section facing in the direction of the outer wall of the panel element. The free end of the section preferably ends in the plane of the outer wall of the panel element in question or is set back slightly in relation to the general extent of the outer wall.

The web can be of resilient design, and the angle ($\alpha$) can be somewhat greater than 135°, preferably approximately 138°. If two adjacent panel elements are arranged at a 90° angle to each other, an undesirable formation of a gap is thereby avoided. In the fitted state, the two webs of the panel elements are displaced counter to the resetting force thereof, and therefore said panel elements bear against each other tightly and therefore without a gap.

The section may be of curved design in the form of a radius, as viewed from the outside. In this case, the contour of the section preferably lies on a circular line. The centre point of said circular line is determined by the intersecting point of two straight lines oriented at right angles to the respective outer wall. The radius corresponds to the distance between the outside of the outer wall and the intersecting point.

The web and the section may be connected via a rounded transition region.

The profile may contain glass fibres and/or carbon fibres or the like.

The profile may contain polyamide (PA), in particular PA 6.

The profile may be designed as a hollow chamber profile.

At least one receptacle for a fastening means, such as a screw, a clip or turn-lock fastener, in particular quarter-turn-lock fastener or the like, may be provided in the bearing limb which, in the fitted state, is in contact with the outside of the frame element.

It is appropriate if at least one fastening means is provided, which fastening means is in particular thermally separated from the panel element, in particular from the outer wall and/or inner wall, and/or which in particular interacts with a receptacle for a fastening means. If a screw, for example, is provided as the fastening means, a plastics washer may be used. As an alternative, the head of the screw may be covered, for example, by a plastics covering or cap.

A washer, in particular a plastics washer, may be provided for the thermal separation. Said washer separates, for example, the screw head from the outer wall.

It is also possible, as an alternative or in addition to a washer, to recess at least one fastening means, for example the screw head of the fastening means, in the profile. For this purpose, the outer wall and/or the profile has an opening, the dimensions of which are larger than the dimensions of the screw head in question. After the fastening of the fastening means, the opening may be closed by a stopper which is composed, for example, of plastic.

A seal, in particular a foamed seal, may be provided in the region of the bearing surface, in particular of the bearing surface which, in the fitted state, is in contact with the outside of the frame segment. This avoids leakages, and therefore a positive pressure or negative pressure can be set within the housing.

The seal may be arranged in a receiving trough provided in particular in the bearing surface.

It is appropriate if the borders of the outer wall and/or of the inner wall are(is) angled in the direction of the corresponding insulating means. The panel element thereby obtains a visually uniform appearance. Since the edges in question are angled in the direction of the insulating means, the edges do not protrude and do not constitute a risk of injury. At the same time, the angling increases the stability of the panel element. The outer wall and/or inner wall may be, for example, adhesively bonded to the profile.

At least one panel element or panel subelement may be designed as a door.

The frame segments of two adjacent housings may be connected to each other, in particular by screwing.

The outer and/or inner wall may be composed of sheet metal, in particular of sheet steel. The thickness may be, for example, 1 mm.

The frame may be composed of steel, in particular stainless steel or galvanized steel, for example a profiled tube made of galvanized steel, or of another suitable material.

At least one frame segment may have a square cross section.

Of course, the housing may also have a panel element in the region of that open side surface with which said housing interacts in a sealing manner with the open side surface of an adjacent housing.

If two housings of different edge lengths are connected to each other, it is appropriate if the larger housing has a panel element in the region of such an open side surface with which said housing, merely in a partial region of said side surface, interacts in a sealing manner with an open side surface of an adjacent housing, wherein the panel element closes only those partial regions of the side surface which are not closed by the open side surface of said adjacent housing.

It is furthermore appropriate here if the panel element has an outer wall closing the open side surface and an insulating means located between the inner wall and the outer wall, in particular a core composed of insulating material.

BRIEF DESCRIPTION OF THE FIGURES

The following is an explanation of an exemplary embodiment of the invention that is illustrated in the drawings, in which:

FIG. 10 shows an enlarged illustration of a corner of a housing.

DETAILED DESCRIPTION OF THE PREFERRED EMBODIMENT(S)

In all of the figures, corresponding reference numbers are used for identical or similar components.

Figure 1:
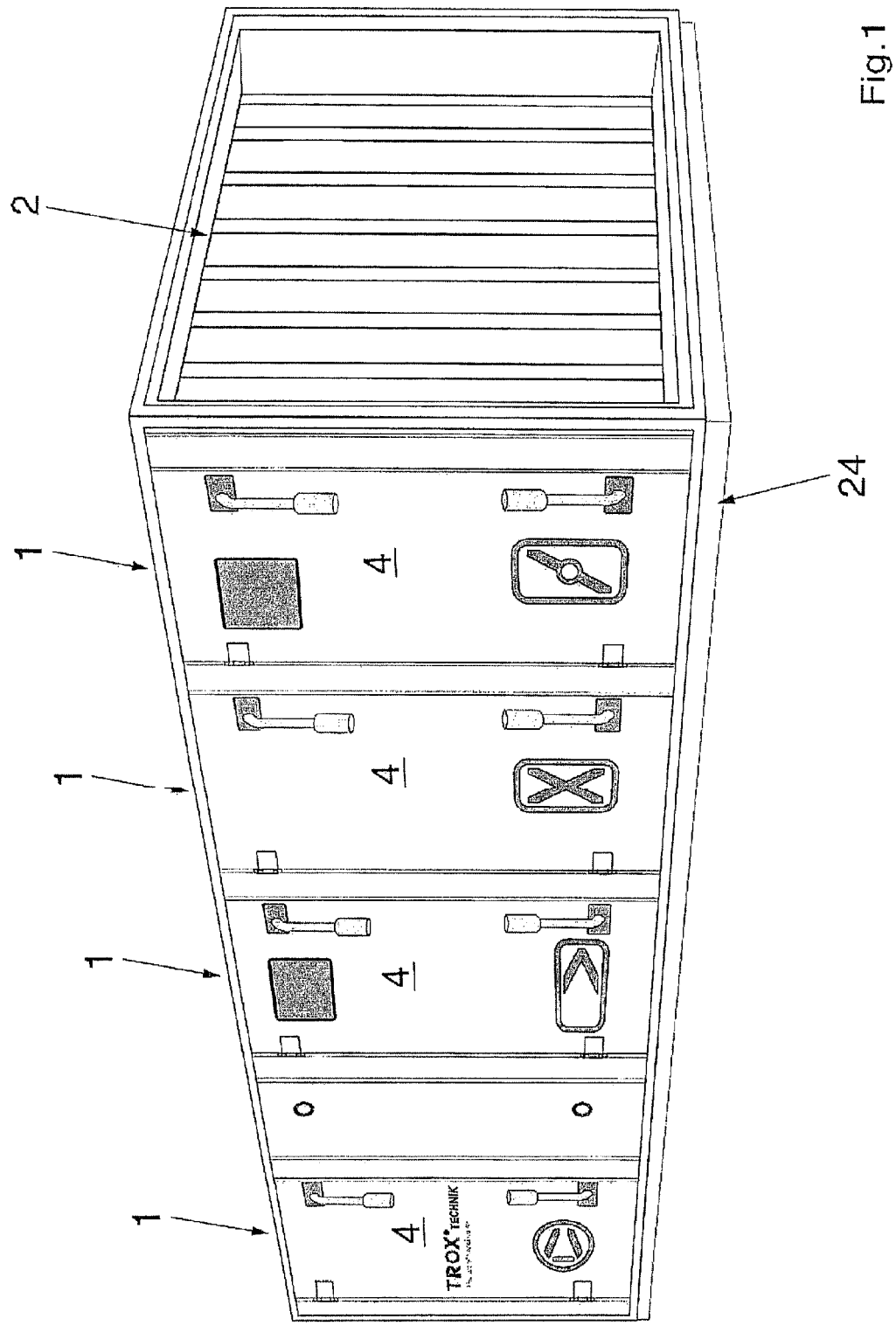
FIG. 1 shows an oblique side view of a plurality of interconnected housings according to the invention.

FIG. 1 shows a side view of four housings 1 according to the invention which are each connected to one another in the region of an open side surface and in which components (not illustrated specifically) of an air-conditioning and/or ventilation system are arranged.

An air inlet opening 2 extending over the entire side surface is illustrated by way of example in the right housing. The air outlet opening can be provided, for example, in the left housing 1. Of course, the number and orientation of the housings 1 to one another can be selected as desired.

Each housing 1 has a frame, wherein the frame consists of twelve square frame segments 3 which form the edge line. The frame segments 3 therefore span six open side surfaces. Each housing 1 is closed in the region of the open side surfaces thereof by a respective panel element 4. The left and the right housing 1 each have one open side surface, and the two central housings 1 each have two open side surfaces which are each connected in a sealing manner to the open side surface of an adjacent housing 1. All four housings 1 are therefore closed to the outside. Of course, each housing 1 is also closed from above and from below by a respective panel element 4.

As can be gathered from FIGS. 2 to 5, each panel element 4 has an inner wall 5, an outer wall 6 and an insulating means 7 located in between. The border of each panel element 4 has, in the region of each edge, a profile 8 which thermally separates the outer and inner wall 6, 5 and, in the exemplary embodiment illustrated, is designed as a hollow chamber profile. The profile 8 is adhesively bonded to the outer and inner wall 6, 5.

Figure 2:
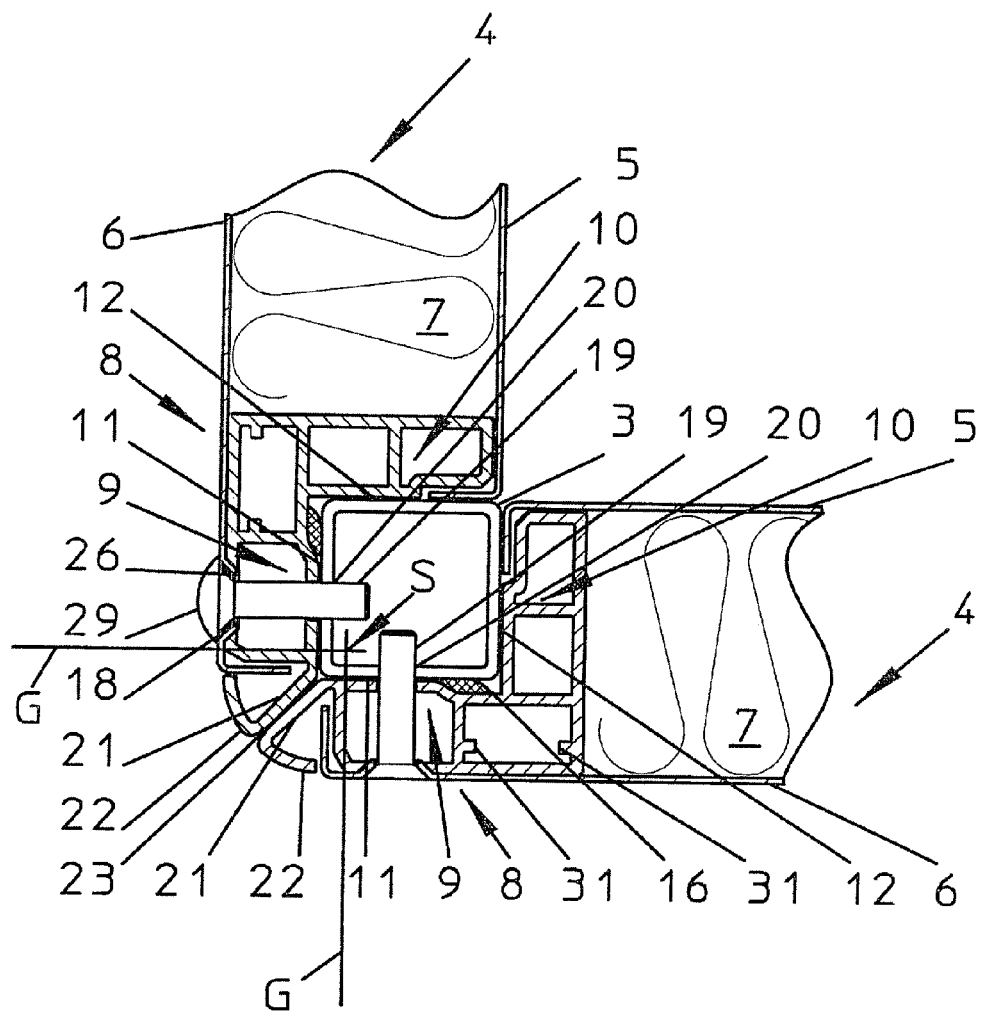
FIG. 2 shows a vertical section through the corner region of a housing.
Figure 3:
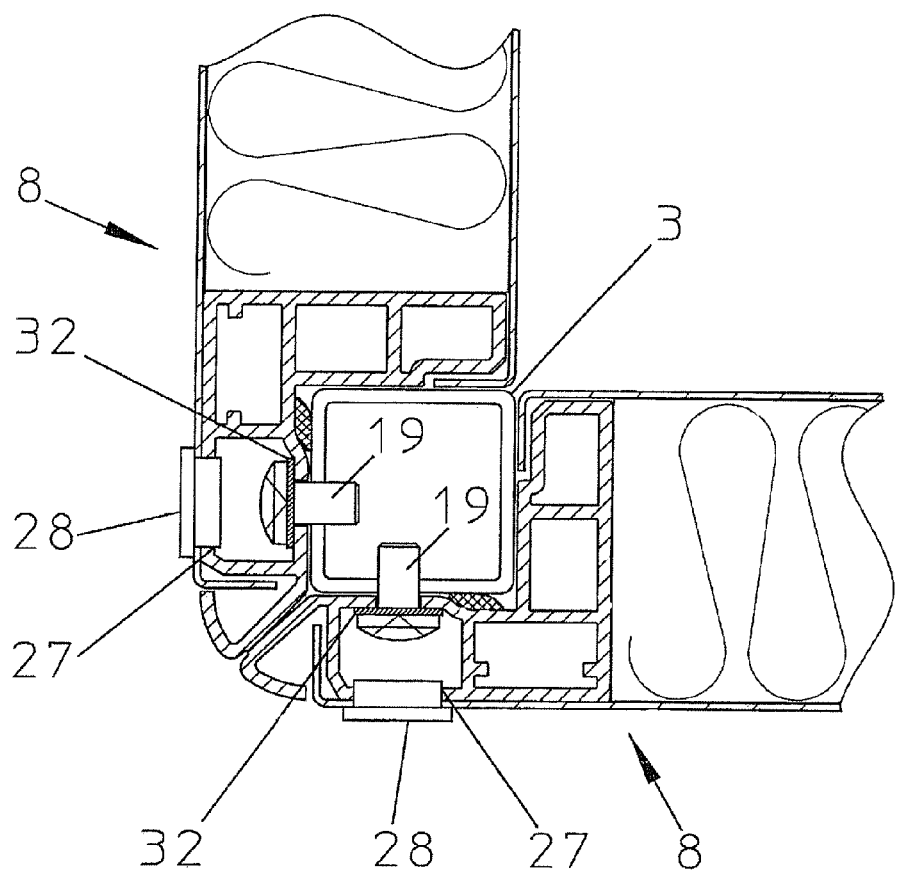
FIG. 3 shows a vertical section through the corner region of a housing with a different screw connection.

Each profile 8 has two bearing limbs 9, 10 with a respective bearing surface 11, 12. In the fitted state, the bearing surface 11 of the one bearing limb 9 extends parallel to the outside of the frame segment 3. As illustrated in FIGS. 2 and 3, in the fitted state, the bearing surface 12 of the other bearing limb 10 extends parallel to that side of the frame segment 3 which faces the interior, which is enclosed by the four frame segments 3 forming the open side surface.

In the fitted state, the bearing surface 12 of a bearing limb 10 can be entirely or else partially in contact with that side of the frame segment 3 which faces the interior, which is enclosed by the four frame segments 3 forming the open side surface.

However, it is also entirely possible, for easy installation of the panel elements 4, for the other bearing limb 10, in the fitted state, to be arranged at a small distance from that side of the frame segment 3 which faces the interior, which is enclosed by the four frame segments 3 forming the open side surface, with a narrow clearance being formed.

As can be gathered from FIGS. 2 to 5, the borders of the outer wall 6 and of the inner wall 5 are angled in the direction of the respective insulating means 7. In order to avoid a protrusion in relation to the bearing surface 12, an offset 13 for receiving the angled region of the inner wall 5 is provided in the bearing surface 12 which is in contact with, or is at a distance from, that side of the frame element 3 which faces the interior, which is enclosed by the four frame segments 3 which form the open side surface. A corresponding offset is also located in the end surface 15 of the other bearing limb 9 in order to receive the angled border of the outer wall 6.

Figure 5:
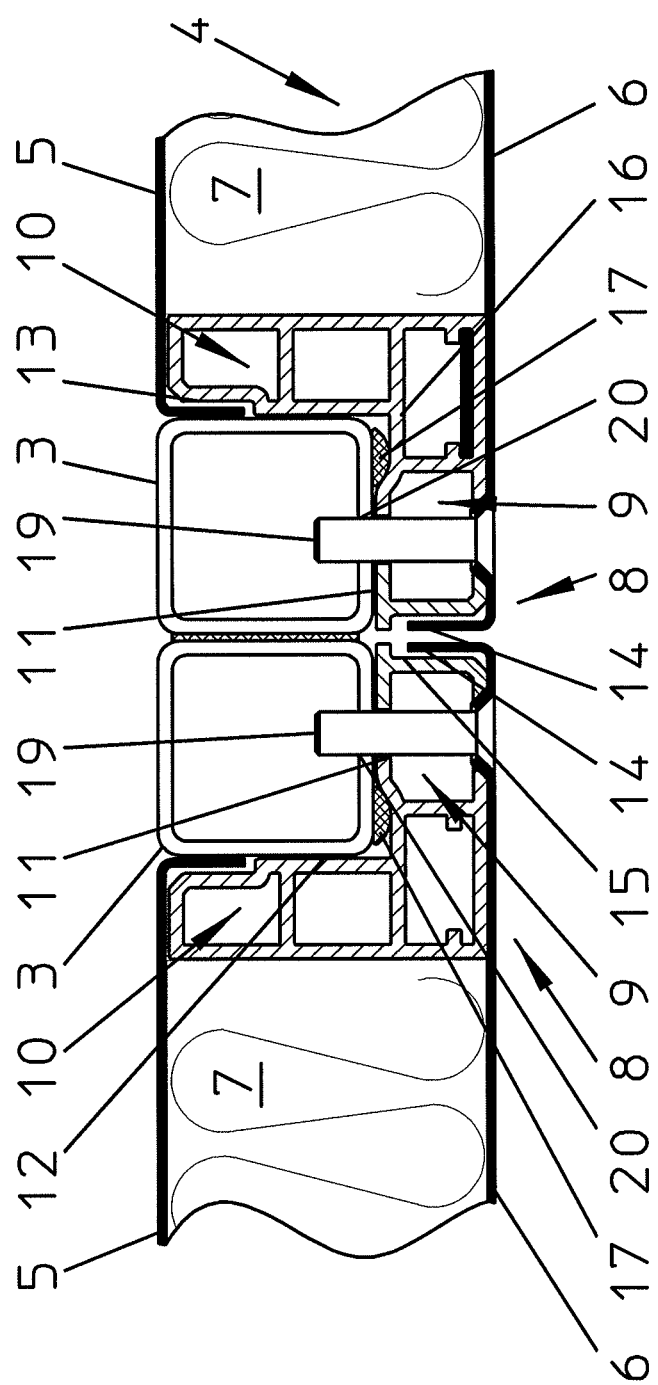
FIG. 5 shows a vertical section in the region of a common frame segment of two neighbouring adjacent housings.

FIG. 5 illustrates the design of the profile 8 if two housings 1 are connected to each other and, as a consequence, two adjacent panel elements 4 are arranged aligned parallel to each other in said region. As can be gathered from FIG. 5, the bearing limbs 9 are designed in such a manner that the frame is completely covered on the outside. The length of the bearing limb 9 corresponds here to the width of the frame segment 3 in question.

As can be gathered from FIG. 5, a receiving trough 16, in which a seal 17 is arranged, is provided in the region of the bearing surface 11 which, in the fitted state, is in contact with the outside of the frame segment 3.

Figure 4:
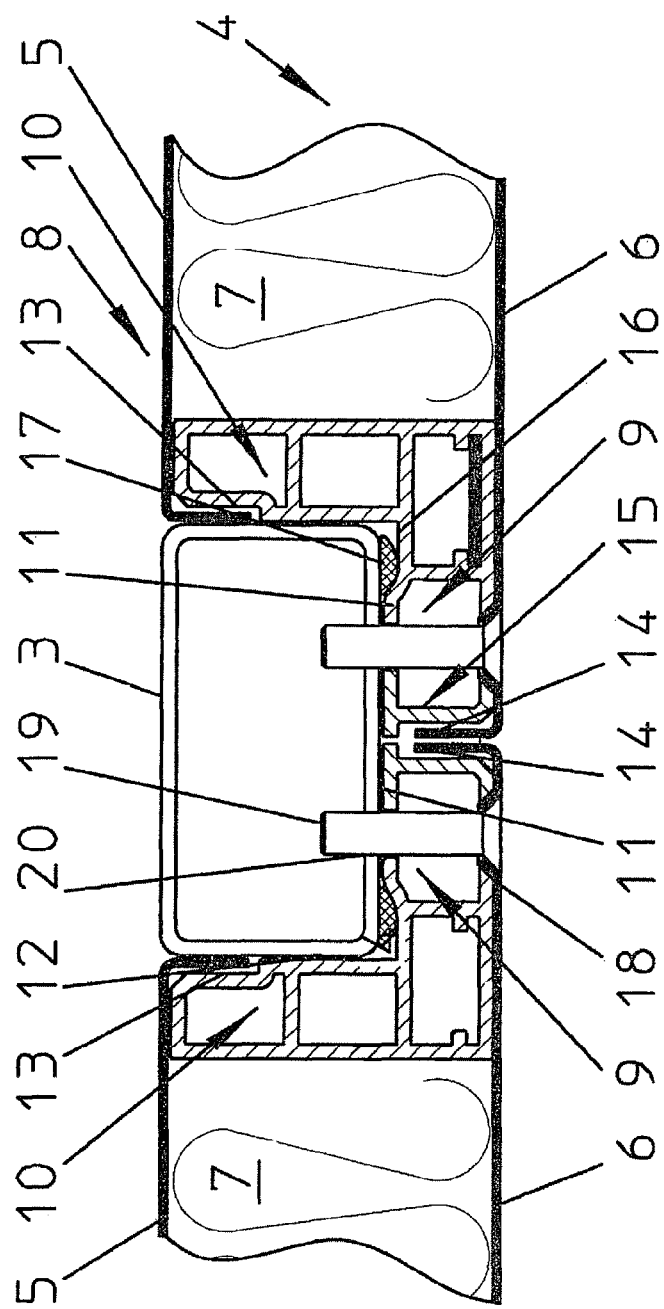
FIG. 4 shows a vertical section in the region of a frame segment designed as an intermediate web.

FIG. 4 shows a section in the region of a frame segment 3 designed as an intermediate web or intermediate element. In this exemplary embodiment, the frame segment 3 is of wider design and serves for the fastening of two panel subelements 4 neighbouring each other. In the exemplary embodiments according to FIG. 7 or 8, a frame segment 3 of this type, which is designed as an intermediate web or intermediate element, is provided, for example, at the points marked by "X".

As illustrated in the figures, a receptacle 18 for a fastening means 19, for example a screw, is provided in the bearing limb 9 which, in the fitted state, is in contact with the outside of the frame segment 3. The frame segment 3 likewise has a hole 20 aligned with the receptacle 18.

In the exemplary embodiment according to FIG. 2, a plastics washer 26 is provided between the screw and the profile 8 for thermal separation. In the exemplary embodiment illustrated, the head of the screw is additionally also covered by a plastics covering 29.

In the exemplary embodiment according to FIG. 3, each screw head is recessed in the profile 8. For this purpose, each profile 8 has an opening 27 which is aligned with the corresponding hole 20. The dimensions of the opening 27 are greater than the dimensions of the screw head in question. Each opening 27 is closed by a stopper 28 which is composed, for example, of plastic. A disc 32, for example a metal sheet or flat rolled steel, is provided between the fastening means 19, which is designed as a screw, and the frame segment 3 in order to distribute the application of load by the screw in a sheet like manner.

FIG. 2 shows the installation situation in the region of one corner of a housing 1. For this purpose, a web 21 is provided on the bearing limb 9 in the region of its free end of the bearing limb 9, which covers the outside of the frame segment 3, the web being arranged at an angle (α) of somewhat more than 135° in relation to the bearing surface 11. At its free end, the web 21 has a rearwardly directed section 22 facing in the direction of the outer wall 6 of the panel element 4.

The web 21 is of resilient design. In the fitted state, the two webs 21 of the bordering panel elements 4 are displaced counter to their resetting force, and therefore said panel elements bear against each other tightly and therefore without a gap.

The section 22 is of curved design in the form of a radius, as viewed from the outside. In other words, the section 22 of web 21 is convex, i.e., curved outward of the housing 1, as best shown in FIGS. 2 and 3. The contour of the section 22 lies on a circular line. The centre point of said circular line is determined by the intersecting point S of two straight lines G oriented at right angles to the respective outer wall 6. The radius corresponds to the distance between the outside of the outer wall 6 and the intersecting point S. The web 21 and the section 22 are connected via a rounded transition region 23. This forms a type of shadow gap, and therefore any tolerance fluctuations are not visually conspicuous.

As can be gathered, for example, from FIG. 2, the length of the web 21 and the radius of the section 22 are selected in such a manner that the free end of the section 22 is set back by approximately 1 mm to the rear in the direction of the frame in relation to the general extent of the outer wall 6 of the corresponding panel element 4.

Stiffening elements, for example of steel, can also be provided in the profile 8 in order to increase the stability. For this purpose, the profile has webs 31 which, together with the outer wall of the profile 8, form a clearance for the introduction of a corresponding stiffening element.

FIG. 10 constitutes an enlarged illustration of a corner of a housing 1. As can be gathered therefrom, only the panel elements 4 and the sections 22 of the profiles 8 can be seen from the outside. The housing 1 therefore obtains an attractive external appearance. The frame segments 3 are not visible from the outside.

Figure 6:
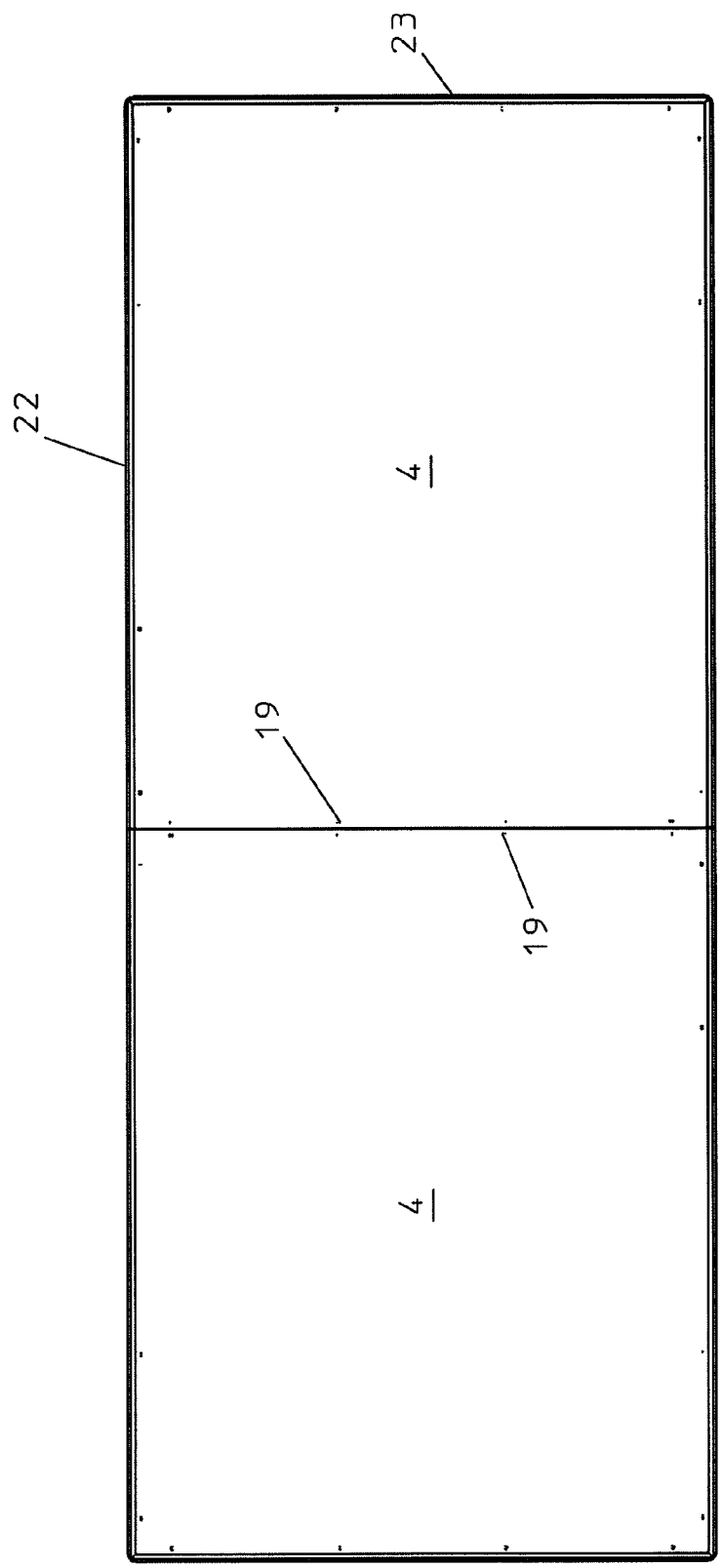
FIG. 6 shows the rear view of two housings according to the invention without a framework structure on the lower side.
Figure 7:
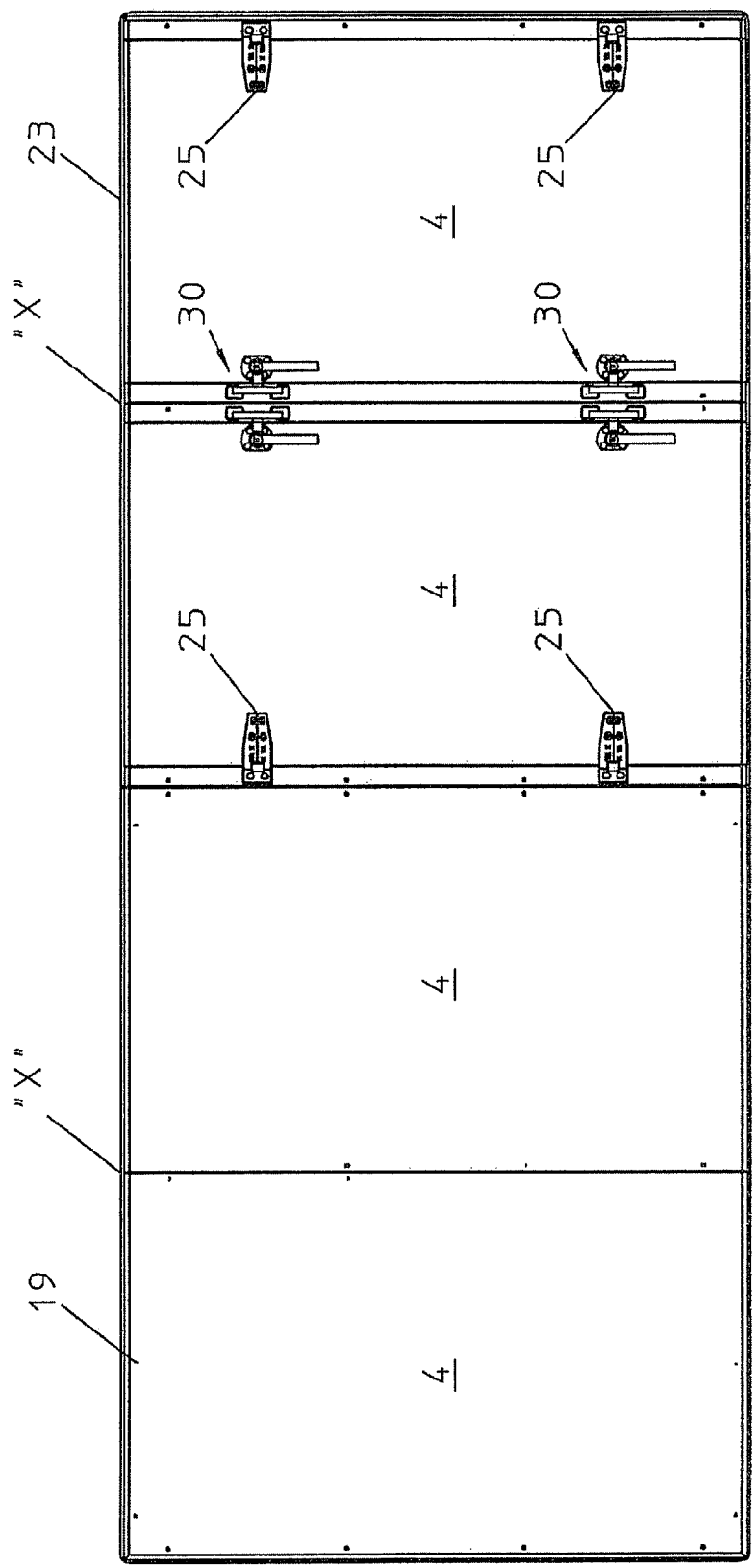
FIG. 7 shows a front view of the subject matter according to FIG. 6.
Figure 8:
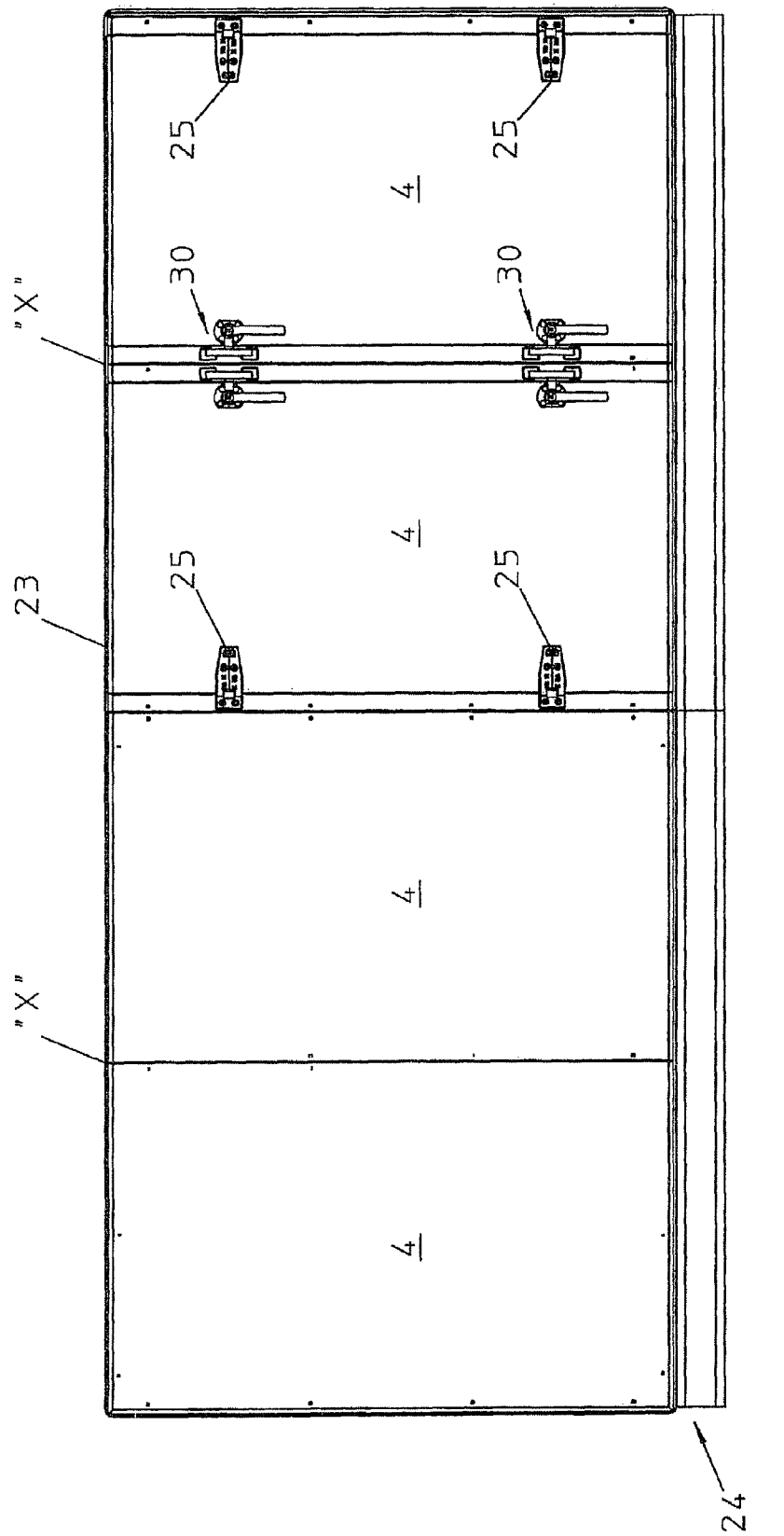
FIG. 8 shows the front view of two housings according to the invention with a framework structure on the lower side.
Figure 9:
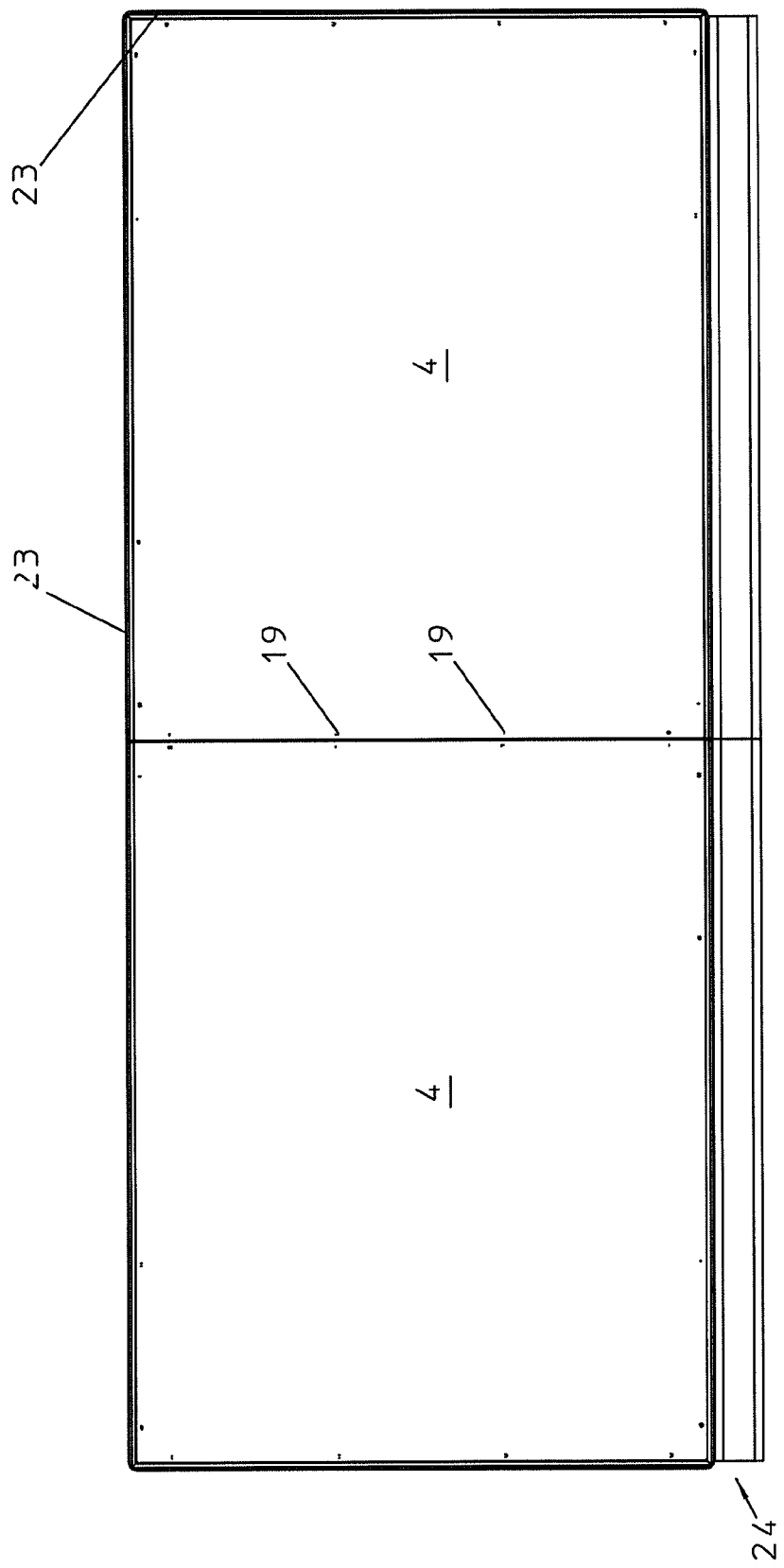
FIG. 9 shows a rear view of the subject matter according to FIG. 8.

FIGS. 6 to 9 each illustrate two interconnected housings 1, wherein the embodiment according to FIGS. 8 and 9 differs from the embodiment according to FIGS. 6 and 7 only in that a framework structure 24 on the lower side is provided as a support. The framework structure 24 is located below the panel element 4, which closes the housing 1 on the lower side, and is screwed to the frames, for example, in the region of the corners thereof. The framework structure 24 is fastened on the lower side to the corresponding housing 1 by means of fastening means 19.

In the embodiments illustrated in FIGS. 6 to 9, each panel element 4 in the region of the front side of the two housings 1 is constructed from two panel subelements in each case.

As can be gathered from FIGS. 7 and 8, the two panel subelements 4 of the left housing 1 are fastened fixedly to in each case fourteen fastening elements 19 on the frame.

The two panel subelements 4 of the right housing 1 are each designed as a door. The panel subelements 4 which are designed as doors are fastened pivotably via hinges 25. Handles 30 which are screwed to the frame segment 3 (at the point marked "X"), which are designed as an intermediate web or intermediate element, are provided for closing purposes.

The present invention has been described herein in terms of one or more preferred embodiments. However, it should be understood that numerous modifications and variations to these embodiments would be apparent to those skilled in the art upon a reading of the foregoing description. Therefore, it is intended that any such modifications and variations comprise a part of this invention, provided they come within the scope of the following claims and their equivalents.

We claim:

1. A cuboidal housing (1) for accommodating components of an air-conditioning or ventilation system, the housing (1) comprising:
   at least one air inlet opening (2);
   at least one air outlet opening; and
   a frame including at least twelve frame segments (3) forming edge lines, the frame segments (3) spanning six open side surfaces;
   panel elements (4) closing in a sealing manner each of the open side surfaces other than the at least one air inlet opening (2) and the at least one air outlet opening;
   each of the panel elements (4) having an inner wall (5) closing the open side surface, an outer wall (6) closing the open side surface, and an insulating core (7) located between the inner wall (5) and the outer wall (6);
   each panel element (4) in the region of each edge has a profile (8) thermally separating the outer and inner walls (6, 5);
   the profile (8) has two bearing limbs (9, 10) each having a bearing surface (11, 12), wherein, in a fitted state, the bearing surface (11) of the one bearing limb (9) of the profile (8) is in contact with an outer side of the frame segment (3) directly or via at least one further component;
   in the fitted state, the bearing surface (12) of another bearing limb (10) of the profile (8) faces the side of the frame segment (3) which is arranged facing in the direction of the interior, which is enclosed by the four frame segments (3) forming the open side surface;
   the respective bearing limbs (9) of two neighbouring profiles of the adjacent panel elements (4) are designed in such a manner that the frame is completely covered at least on the outside,
   wherein at least in each case the one bearing limb (9) of each of the neighbouring profiles (8) in the region of a free end of the bearing limb (9), which covers the outside of the frame segment (3), is formed at an angle (a) of approximately 135° with respect to the bearing surface (11) of the bearing limb (9).

2. A cuboidal housing (1) for accommodating components of an air-conditioning or ventilation system, the housing (1) comprising:
   at least one air inlet opening (2);
   at least one air outlet opening; and
   a frame including at least twelve frame segments (3) forming edge lines, the frame segments (3) spanning six open side surfaces;
   panel elements (4) closing in a sealing manner each of the open side surfaces other than the at least one air inlet opening (2) and the at least one air outlet opening;
   each of the panel elements (4) having an inner wall (5) closing the open side surface, an outer wall (6) closing the open side surface, and an insulating core (7) located between the inner wall (5) and the outer wall (6);
   each panel element (4) in the region of each edge has a profile (8) thermally separating the outer and inner walls (6, 5);
   the profile (8) has two bearing limbs (9, 10) each having a bearing surface (11, 12), wherein, in a fitted state, the bearing surface (11) of the one bearing limb (9) of the profile (8) is in contact with an outer side of the frame segment (3) directly or via at least one further component;
   in the fitted state, the bearing surface (12) of another bearing limb (10) of the profile (8) faces the side of the frame segment (3) which is arranged facing in the direction of the interior, which is enclosed by the four frame segments (3) forming the open side surface;
   the respective bearing limbs (9) of two neighbouring profiles of the adjacent panel elements (4) are designed in such a manner that the frame is completely covered at least on the outside,
   wherein at least in each case the one bearing limb of each of the neighbouring profiles (8) in the region of a free end of the bearing limb (9), which covers the outside of the frame segment (3), has a web (21) which is arranged at an angle (a) of approximately 135° with respect to the bearing surface (11) of the bearing limb (9); and wherein the web (21) is arranged in the region of the inner edge and, at the free end thereof, has a rearwardly directed section (22) facing in the direction of the outer wall (6) of the panel element (4).

3. The cuboidal housing according to claim 2, wherein the web (21) is resilient and the angle (a) is greater than 135°.

4. The cuboidal housing according to claim 2, wherein the section (22) is convex as viewed from the outside.

5. The cuboidal housing according to claim 2, wherein the web (21) and the section (22) are connected via a rounded transition region (23).

6. The cuboidal housing according to claim 2, wherein the profile (8) contains at least one of glass fibres and carbon fibres.

7. The cuboidal housing according to claim 2, wherein the profile (8) contains polyamide.

8. The cuboidal housing according to claim 2, wherein the profile (8) is designed as a hollow chamber profile.

9. The cuboidal housing according to claim 2, wherein at least one receptacle (18) for a fastening means (19) is provided in the bearing limb (9) which, in the fitted state, is in contact with the outside of the frame segment (3).

10. The cuboidal housing according to claim 2, further comprising at least one fastening means (19) thermally separated from the outer wall (6) or the inner wall (5); and wherein the at least one fastening means (19) interacts with a receptacle (18) for the at least one fastening means (19).

11. The cuboidal housing according to claim 10, wherein a washer (26) is provided for the thermal separation.

12. The cuboidal housing according to claim 2, wherein at least one fastening means (19) is recessed in the profile (8).

13. The cuboidal housing according to claim 2, wherein a seal (17) is provided in the region of the bearing surface (11, 12); the bearing surface, in the fitted state, is in contact with the outside of the frame segment (3).

14. The cuboidal housing according to claim 13, wherein the seal (17) is arranged in a receiving trough (16) provided in the bearing surface (11, 12).

15. The cuboidal housing according to claim 2, wherein the borders of the outer wall (6) or of the inner wall (5) is angled in the direction of the corresponding insulating means (7).

16. The cuboidal housing according to claim 2, wherein at least one panel element (4) is designed as a door.

17. The cuboidal housing according to claim 2, wherein the frame segments (3) of two adjacent housings (1) are connected to one another.

18. The cuboidal housing according to claim 2, wherein the outer wall or inner wall (6, 5) are(is) composed of sheet metal.

19. The cuboidal housing according to claim 2, wherein the frame is composed of steel.

20. The cuboidal housing according to claim 2, wherein at least one frame segment (3) has a square cross section.

21. The cuboidal housing according to claim 2, wherein the housing (1) has a panel element (4) in the region of one of the open side surfaces with which said housing interacts in a sealing manner with an open side surface of an adjacent housing (1).

22. The cuboidal housing according to claim 2, wherein the housing (1) has the panel element (4) in the region of such an open side surface with which the housing, only in a partial region of the side surface, interacts in a sealing manner with an open side surface of an adjacent housing (1), wherein the panel element (4) closes only the partial regions of the side surface which are not closed by the side surface of the adjacent housing (1), and wherein the panel element (4) has an outer wall (6) closing the open side surface and an insulating core (7) located between the inner wall (5) and the outer wall (6).

\* \* \* \* \*